United States Patent
Ahmed et al.

(10) Patent No.: US 7,940,759 B2
(45) Date of Patent: May 10, 2011

(54) ROBUST TECHNIQUE FOR FRAME SYNCHRONIZATION IN DAB-IP SYSTEMS

(75) Inventors: Elsayed Ahmed, Cairo (EG); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 611 days.

(21) Appl. No.: 11/766,816

(22) Filed: Jun. 22, 2007

(65) Prior Publication Data

US 2008/0317022 A1 Dec. 25, 2008

(51) Int. Cl.
H04L 12/56 (2006.01)
(52) U.S. Cl. ......... 370/389; 714/751; 714/775; 714/784
(58) Field of Classification Search .................. None
See application file for complete search history.

(56) References Cited

U.S. PATENT DOCUMENTS

| | | | |
|---|---|---|---|
| 7,257,764 B2 * | 8/2007 | Suzuki et al. ................ | 714/774 |
| 7,409,627 B2 * | 8/2008 | Kim et al. ................... | 714/776 |
| 2003/0226092 A1 * | 12/2003 | Kim et al. ................... | 714/776 |
| 2005/0262419 A1 * | 11/2005 | Becker et al. ................ | 714/758 |
| 2006/0262810 A1 * | 11/2006 | Vadakital et al. ............ | 370/473 |
| 2007/0250752 A1 * | 10/2007 | Prosch et al. ................ | 714/752 |
| 2008/0199021 A1 * | 8/2008 | Park ............................. | 381/81 |
| 2008/0307290 A1 * | 12/2008 | Koch et al. ................... | 714/776 |

* cited by examiner

Primary Examiner — Daniel J Ryman
Assistant Examiner — Brian Roberts
(74) Attorney, Agent, or Firm — Rahman LLC

(57) ABSTRACT

FEC frame synchronization in a DAB-IP system comprising FEC frames includes receiving FEC packets each comprising a FEC packet header and a FEC data field comprising padding bytes at an end of a last FEC packet received; comparing a received FEC packet header with a known FEC packet header until a number of bit errors in the received FEC packet header is less than or equal to a predetermined amount; and matching the received FEC packet header and the padding bytes until at least one of the following actions occur thereby resulting in receiver locking: a number of successive FEC packet headers mismatches in the received FEC packet header; a predetermined number of FEC packets end without padding matching; and FEC packet header and padding matching occurs. The received FEC packets are tracked after receiver locking has occurred to ensure FEC parity packets are positioned properly in the FEC frames.

20 Claims, 8 Drawing Sheets

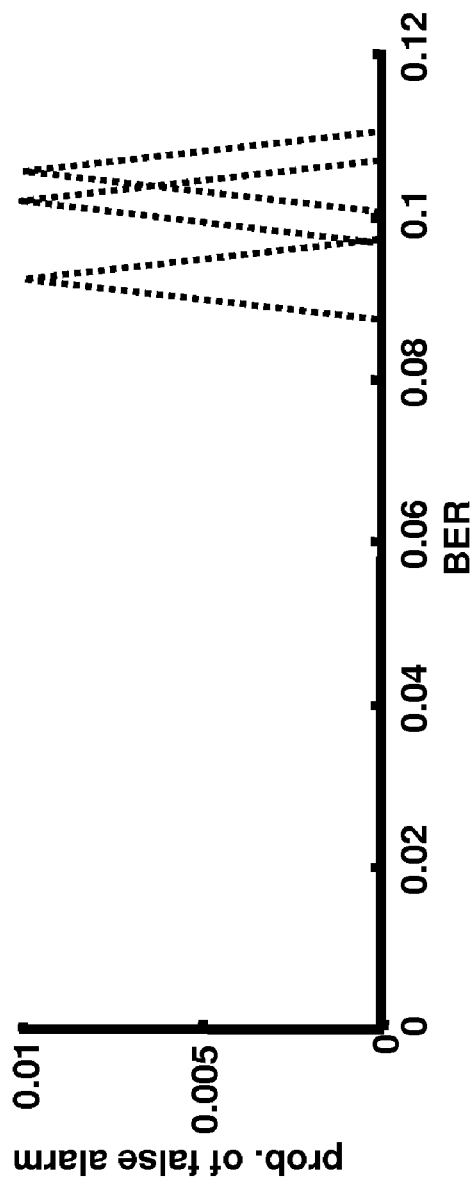
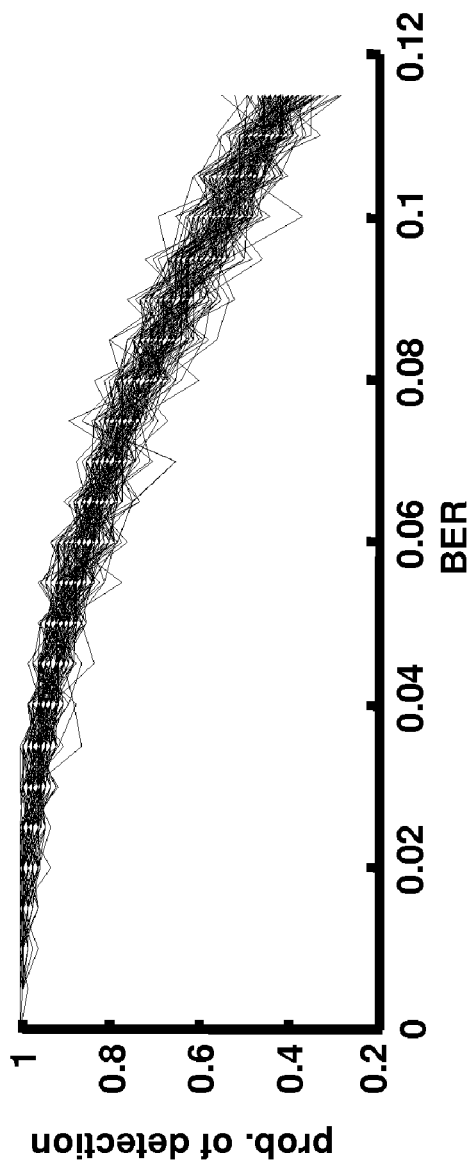
FIG. 6(A)
FIG. 6(B)

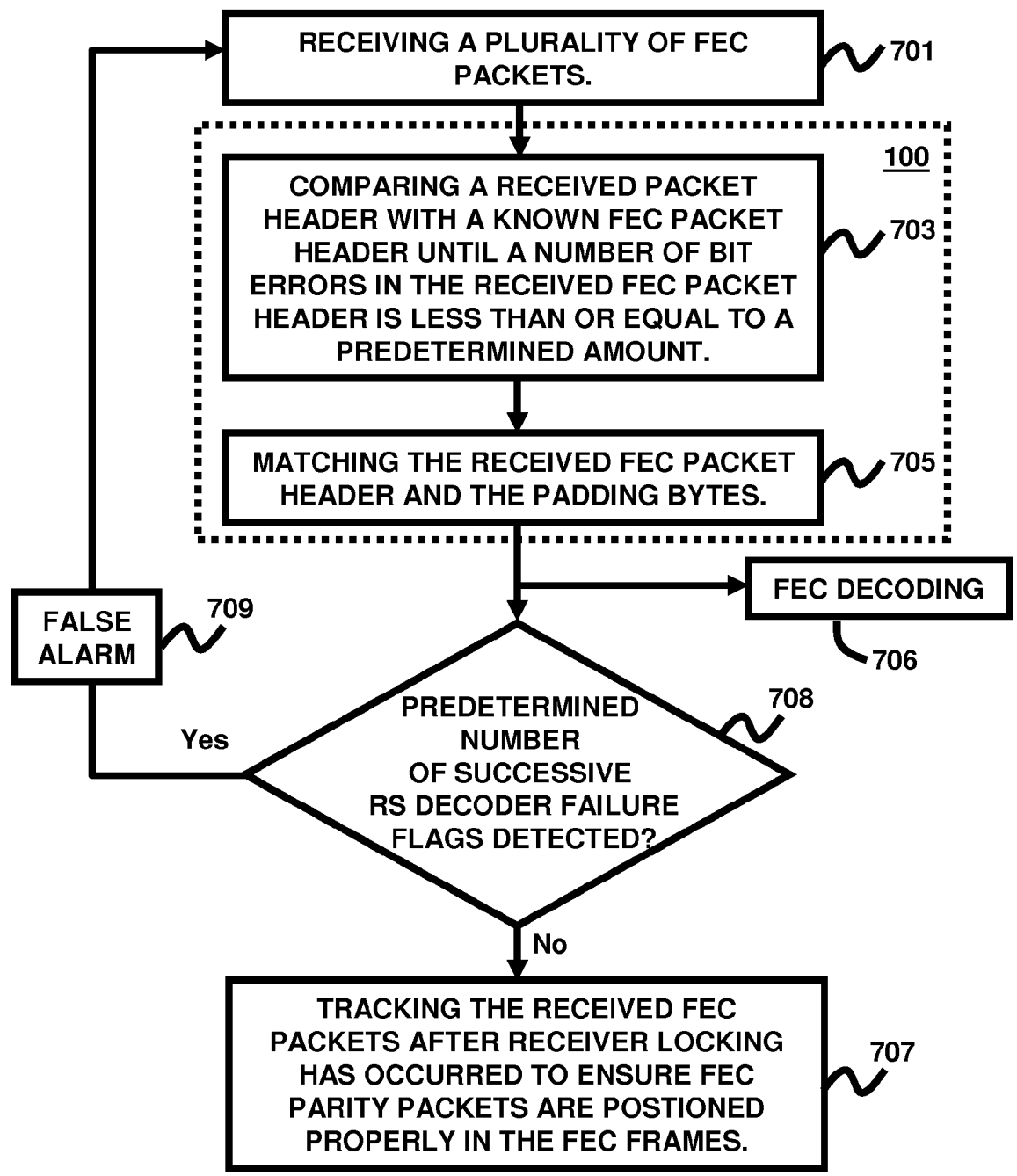

ROBUST TECHNIQUE FOR FRAME SYNCHRONIZATION IN DAB-IP SYSTEMS

BACKGROUND

1. Technical Field

The embodiments herein generally relate to wireless communications systems, and, more particularly, to enhanced packet modes in Digital Audio Broadcasting-Internet Protocol (DAB-IP) systems.

2. Description of the Related Art

At the transmitter side of a wireless communications system, service component data content (IP datagrams) can be structured into Main Service Channel (MSC) data groups for transport in one or more data packets. An MSC data group contains a data group header, a data group data field, and an optional data group Cyclic Redundancy Check (CRC). The information associated with one MSC data group is transmitted in one or more data packets, sharing the same address. All packets may contain padding bytes. FIG. 1 shows the situation when a MSC data group is spread across several packets, sharing the same address.

Forward Error Correction (FEC), in the form of Reed Solomon (RS) outer error protection and outer interleaving, can be applied to sub-channels carrying service components in a packet mode in order to further increase the error robustness of DAB data delivery. In this context, error robustness refers to the fact that the receiver will be able to correct more errors (i.e., the RX can operate under small signal to noise ratio). FIG. 2 shows the structure of a FEC frame 50. The frame has the dimensions of 204 columns by 12 rows and includes an Application Data Table of 188 columns by 12 rows (i.e., 2,256 bytes) and an RS Data Table of 16 columns by 12 rows (i.e., 192 bytes).

Data packets are fed into the Application Data Table. The RS Data Table is filled by calculating the RS codeword from each row of data. The RS Data Table is transported within nine consecutive FEC packets. The set of FEC packets is transmitted immediately following the Application Data Packet Set used to form the Application Data Table. The structure of the FEC packets is shown in FIG. 3. The complete set of FEC packets used to transport the RS data is shown in FIG. 4.

At the receiver side of a wireless communications system, the receiver receives the transmitted packets and it must construct the FEC frame and then apply RS decoding on this frame to correct the errors (if any). When the receiver is on, it starts to receive packets. It is not necessary that the first received packet is the first packet in the FEC frame; it may be any packet inside the FEC frame, therefore the receiver cannot begin to build the FEC frame until it receives the first packet in the FEC frame then begins to fill it, thus one must detect the beginning of the FEC frame because if there are any small differences between the transmitted FEC frame and the FEC frame constructed by the receiver using the received packets, then the position of the RS parity bytes will be changed and RS decoder will fail to decode the frame and all of the subsequent frames, thus, all received data will be corrupted. Accordingly, there remains a need for a technique for FEC frame synchronization in DAB-IP systems.

SUMMARY

In view of the foregoing, an embodiment provides a method of performing FEC frame synchronization in a DAB-IP system comprising FEC frames, and a program storage device readable by computer comprising a program of instructions executable by the computer to perform the method comprising receiving a plurality of FEC packets, wherein each FEC packet comprises a FEC packet header and a FEC data field, and wherein the FEC data field comprises padding bytes at an end of a last FEC packet received; comparing a received FEC packet header with a known FEC packet header until a number of bit errors in the received FEC packet header is less than or equal to a predetermined amount; and matching the received FEC packet header and the padding bytes until at least one of the following actions occur thereby resulting in receiver locking: a number of successive FEC packet headers mismatches in the received FEC packet header; a predetermined number of FEC packets end without padding matching; and FEC packet header and padding matching occurs. The method further comprises tracking the received FEC packets after receiver locking has occurred to ensure FEC parity packets are positioned properly in the FEC frames.

Moreover, the method may further comprise performing FEC decoding upon completion of the locking process using a RS decoder. Preferably, the tracking process comprises monitoring failure flags of the RS decoder. Additionally, the method may further comprise repeating the receiving through matching steps when a predetermined number of successive RS decoder failure flags are detected. Also, the method may further comprise initiating a false alarm when the predetermined number of successive RS decoder failure flags are detected thereby indicating that the receiver is locked at an incorrect position. Preferably, the method further comprises using a three state Finite State Machine (FSM) to perform the comparing through matching steps. Furthermore, the predetermined number of FEC packets end without padding matching equals 9 minus a number of successive packet headers matching to start searching for padding.

Another embodiment provides an electronic system for performing FEC frame synchronization in a DAB-IP system comprising FEC frames, wherein the electronic system comprises a plurality of FEC packets, wherein each FEC packet comprises a FEC packet header and a FEC data field, and wherein the FEC data field comprises padding bytes at an end of a last FEC packet received; and a three state Finite State Machine (FSM) adapted to: compare a received FEC packet header with a known FEC packet header until a number of bit errors in the received FEC packet header is less than or equal to a predetermined amount; match the received FEC packet header and the padding bytes until at least one of the following actions occur thereby resulting in receiver locking: a number of successive FEC packet headers mismatches in the received FEC packet header; a predetermined number of FEC packets end without padding matching; and FEC packet header and padding matching occurs. The FSM is further adapted to track the received FEC packets after receiver locking has occurred to ensure FEC parity packets are positioned properly in the FEC frames.

The electronic system may further comprise a RS decoder adapted to perform FEC decoding upon completion of the locking process, wherein the RS decoder comprises failure flags adapted to allow the FSM to track the received FEC packets, and wherein when a predetermined number of successive RS decoder failure flags are detected, the FSM is adapted to repeat the compare and match functions. Additionally, the electronic system further comprises a false alarm indicator adapted to issue a false alarm when the predetermined number of successive RS decoder failure flags are detected thereby indicating that the receiver is locked at an incorrect position. Preferably, the predetermined number of FEC packets end without padding matching equals 9 minus a number of successive packet headers matching to start searching for padding.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 6(A) and 6(B) are graphical representations illustrating results achieved by the embodiments herein;

FIG. 7 is a flow diagram illustrating a preferred method according to an embodiment herein.

DETAILED DESCRIPTION OF PREFERRED EMBODIMENTS

Figure 1:
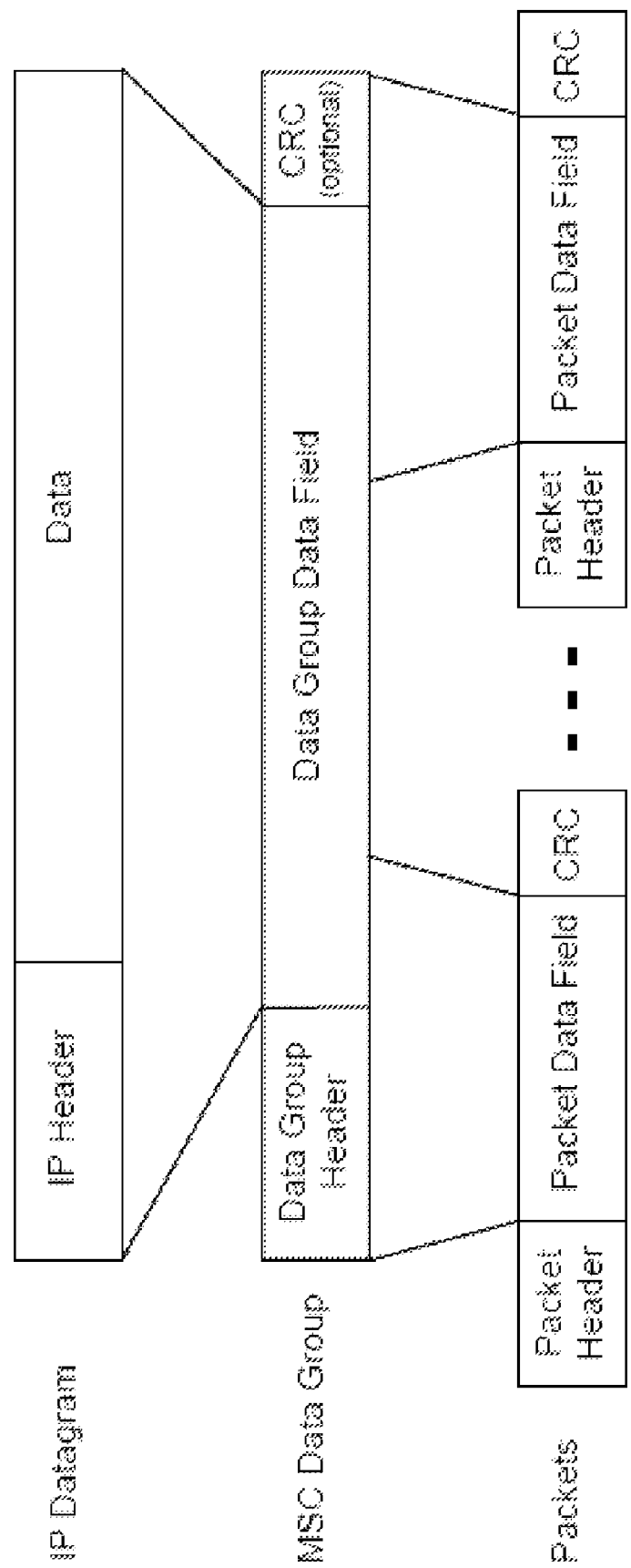
FIG. 1 is a schematic diagram illustrating the relationship between an IP datagram, a MSC data group, and a sequence of packets.
Figure 2:
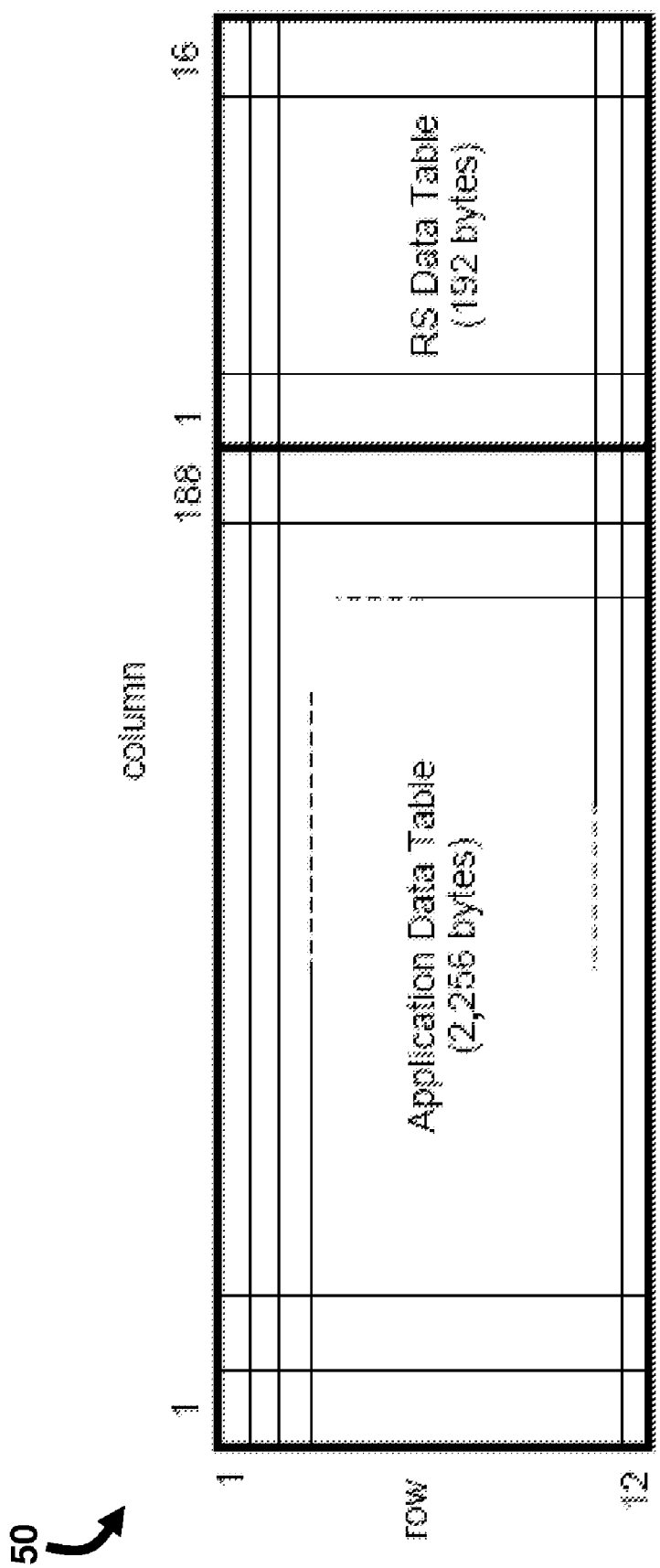
FIG. 2 is a schematic diagram illustrating the structure of a FEC frame.
Figure 3:
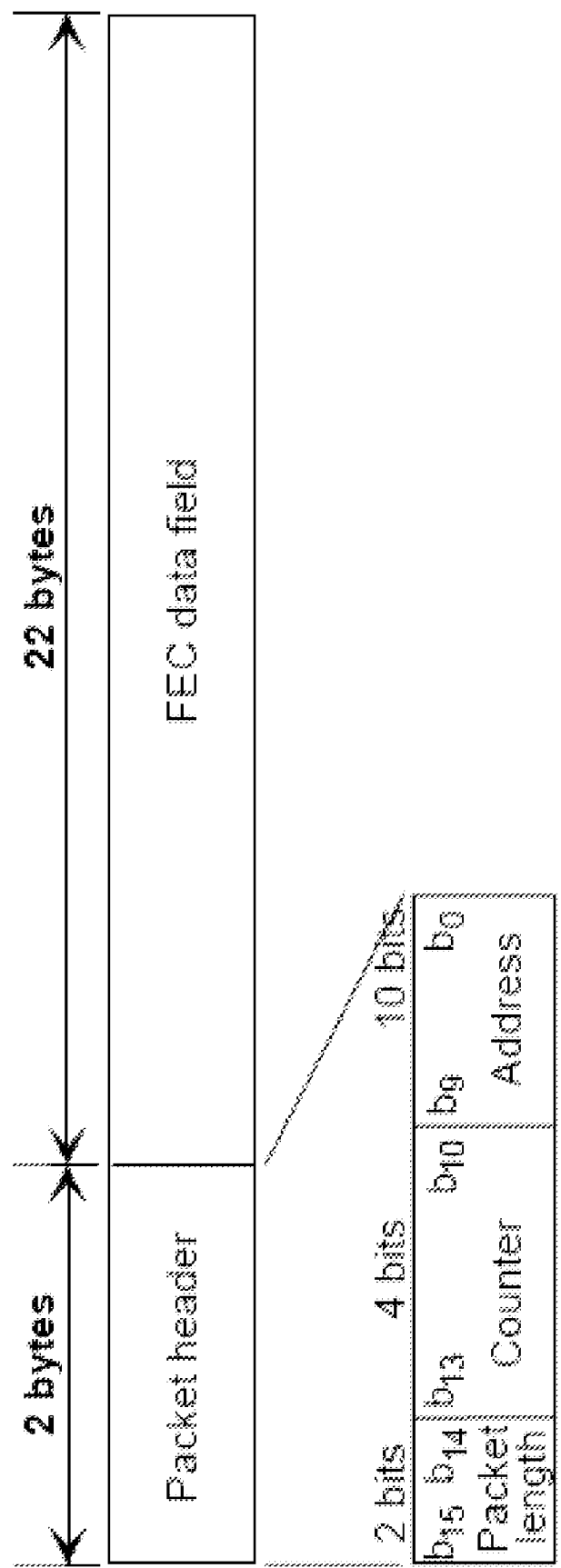
FIG. 3 is a schematic diagram illustrating the structure of a FEC packet.
Figure 4:
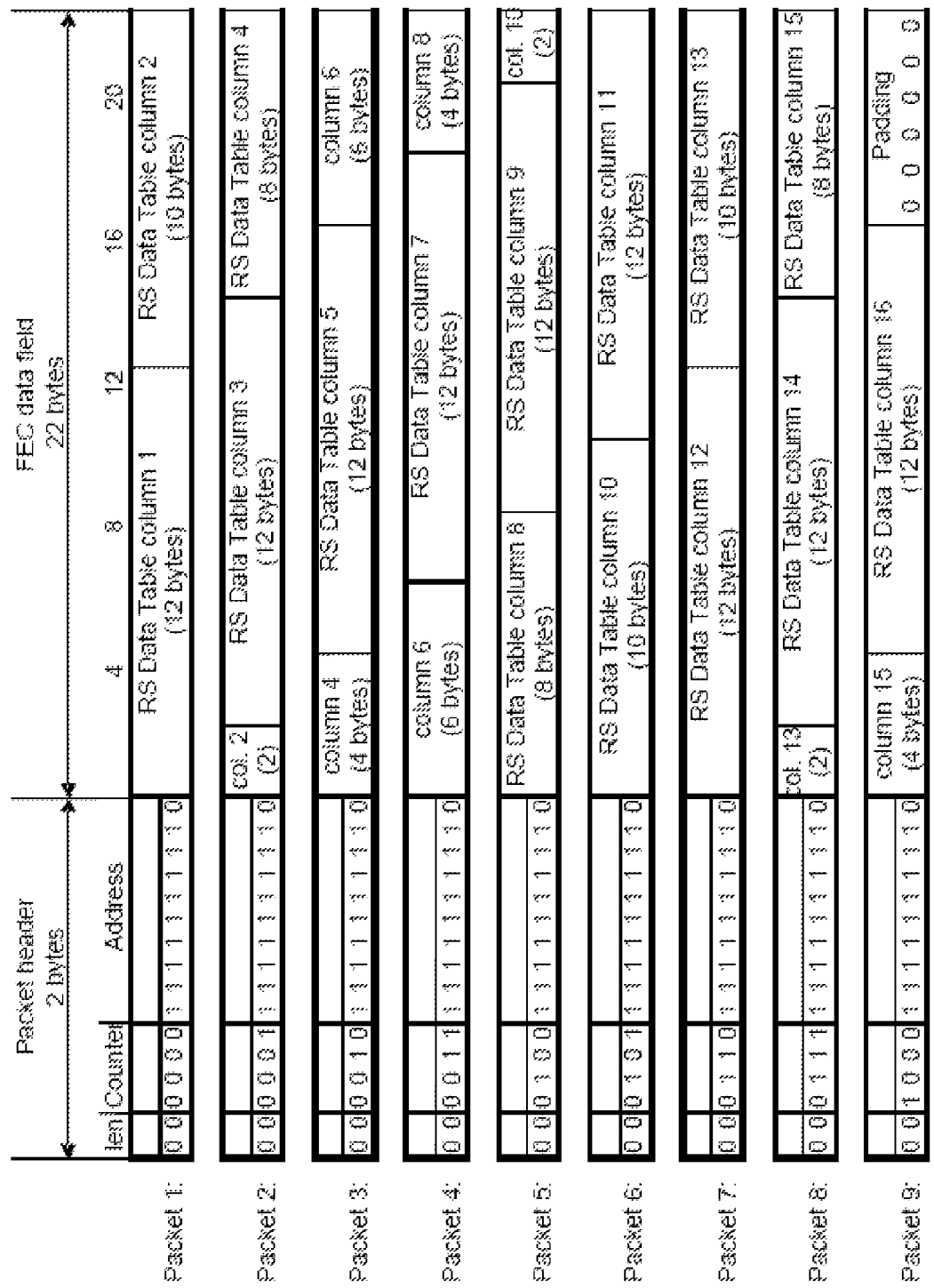
FIG. 4 is a schematic diagram illustrating a complete FEC packet set according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a technique for FEC frame synchronization in DAB-IP systems. The embodiments herein achieve this by providing a technique that synchronizes FEC frames even after beginning to receive some RS parity packets. Referring now to the drawings, and more particularly to FIGS. 5 through 8, where similar reference characters denote corresponding features consistently throughout the figures, there are shown preferred embodiments.

The embodiments herein detect the start of a FEC frame from the received stream and utilize the detection of RS parity packets. Because the RS parity packets header (the address and length fields) is known, so is the six padding (zero) bytes at the end of the last packet. Depending on this knowledge, a receiver can correlate the received header and padding with the actual header and padding to detect RS parity packets.

However, because DAB-IP systems are communication systems, there will be a probability of error at the receiver, therefore the received RS parity packets may have errors, and these errors may be in any position in the packets including the header and padding bytes. Accordingly, the embodiments herein are able to synchronize in the presence of these errors. Moreover, as previously mentioned, when the receiver is on, the first received packet is not necessarily the first packet in the FEC frame, it may be any packet, and it may be RS parity packet. Accordingly, the embodiments herein are able to synchronize if it starts after receiving some of RS parity packets. The embodiments herein achieve these attributes as follows.

The embodiments herein detect RS parity packets by matching the received header with the true one exactly nine times then matching the padding, but a probability of error at the receiver is likely. To solve this problem, the embodiments herein match the received header with the true one by an acceptable number of bit errors per header. This number is the first parameter in the technique afforded by the embodiments herein and is called "h_err". There is another parameter to solve the same problem in padding called "padd_err" (acceptable number of bit errors per padding).

Still the synchronization problem has not been solved because in the conventional methods, it is assumed that the receiver will start before receiving all RS parity packets, but it is not always the case. To handle this problem, the embodiments herein add another parameter called "num_to_start" which is the number of successive packet headers matching to start searching for padding. These parameters are the algorithm parameters and can be embodied as programmable registers on the chip but, alternatively, in other applications it may be added software or hardware. For example, if this parameter=3 the receiver will start searching for padding after 3 header matching (not 9 like above) so if the receiver starts at the 7's RS parity packet, it still can detect the FEC frame end. More particularly, if "num_to_start"=3, this means that it will start to search for padding after 3 header matching therefore if the receiver starts at the 7's RS parity packet, then there are 3 remaining RS parity packets (packet 7, 8 and 9), since the header in the 3 packets is matched with the true one and if the headers are matched (within the permissible number of errors "h_err") then the process searches for padding in the third packet (this is because "num_to_start"=3), and if the padding is matched (within the permissible number of errors "padd_err") with the true one, then the receiver is instructed that the FEC frame start detected has been detected.

There are another two parameters added to improve the performance of the technique provided by the embodiments herein. First, "num_to_restart" is the number of successive header mismatch to restart the method. Second, "num_same_err". To understand what the meaning of this parameter is and why it is added, consider the following case. First, it is known that the address of RS parity packets is "1111111110" and the length is "00", if one has successive data packets carrying address="1110111110" which is different from RS packets address in one bit only, and one of these packets end by padding (zeros), when the method provided by the embodiments herein is applied (with "h_err"=2) on this case, the method compares the header and padding and finds that they are matched within the permissible number of bit errors per header, which is not the case (i.e., this action will be a false alarm). For this reason, this parameter is added to handle this problem. Accordingly, this parameter means the number of successive header matching with the same error position needed to restart the search for FEC parity packets.

Figure 5:
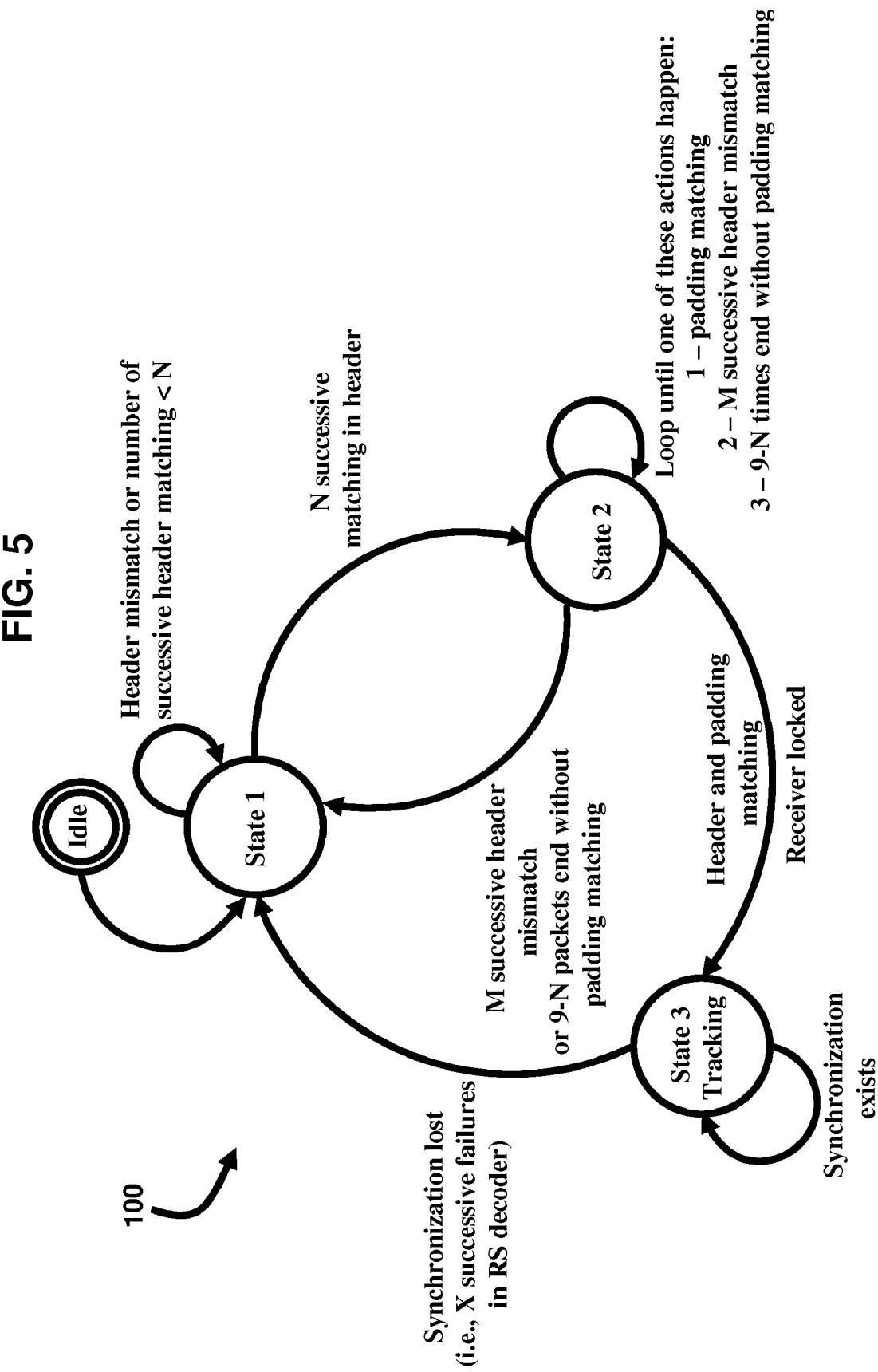
FIG. 5 is a schematic diagram illustrating a finite state machine (FSM) technique according to an embodiment herein.

The method provided by the embodiments herein is implemented using a hardware element comprising a three state finite state machine (FSM) 100, which is shown in FIG. 5. In State 1, one compares the received header with the true header until successive "num_to_start" are received that are matching in the header, and then the process proceeds to State 2. The true header is initially detected because it has a fixed pattern known at the RX. Header matching means that the number of bit errors in the header is less than or equal to "h_err".

In State 2, one matches the received header and padding until one of the following actions happen: (a) "num_to_restart" successive mismatches in the header; in this case one can restart the FSM and return to State 1 to start searching; (b) (9–"num_to_start") packets end without padding matching; in this case also one can restart the FSM and return to State 1 to start searching; and (c) header and padding matching; in this case when one receives header and padding matching, the receiver is instructed that it is now locked and ready to start FEC decoding, then one may proceed to State 3. A receiver that is locked means that now the receiver knows the start of the FEC frame and it can start to construct the FEC frames and start the RS decoder.

State 3 (tracking state) is added to ensure that locking was true. Because if the receiver has false locking it will fail in decoding all data, therefore State 3 (tracking state) is added to track the received FEC frames after locking to ensure that the FEC parity packets comes in its correct position. This tracking is performed by monitoring the failure flag of the RS decoder. If it is found that there are X successive RS decoder failures, then most probably there is a false synchronization therefore and the FSM is restarted. After locking, the receiver starts to construct FEC frames and apply RS decoding then if the synchronization (detection of FEC frame start packet) was incorrect then the RS decoder will fail to correct the packets and it will return a flag called a failure flag (this flag will indicate whether the RS fails to decode the packets). In State 3, this flag is monitored and if X successive failures are detected, the process is restarted.

FIGS. 6(A) and 6(B) illustrate experimental results achieved by the embodiments herein. These graphs show the probability of false alarms and the probability of detection versus the bit error rate using different data packet addresses. In this context, a false alarm means that the receiver is locked at incorrect position. FIG. 6(A) shows how the probability of false alarms (false alarm means that the receiver is locked at the incorrect position) varies with the Bit Error Rate (BER). It is shown that the probability of a false alarm=0 for a BER up to 0.08, which means that at a BER less than or equal to 0.08, the process can take a wrong decision (locked at wrong position) with a probability=0. At a BER=0.1, the process can take a wrong decision with probability=0.01. FIG. 6(B) shows how the probability of detection varies with the BER (probability of detection means if there are valid RS parity packets what is the probability that the process can detect that there are valid RS parity packets).

FIG. 7, with reference to FIGS. 1 through 6(B), is a flow diagram illustrating a method of performing FEC frame synchronization in a DAB-IP system comprising FEC frames 50, wherein the method comprises receiving (701) a plurality of FEC packets, wherein each FEC packet comprises a FEC packet header and a FEC data field, and wherein the FEC data field comprises padding bytes at an end of a last FEC packet received; comparing (703) a received FEC packet header with a known FEC packet header until a number of bit errors in the received FEC packet header is less than or equal to a predetermined amount; and matching (705) the received FEC packet header and the padding bytes until at least one of the following actions occur thereby resulting in receiver locking: a number of successive FEC packet headers mismatches in the received FEC packet header; a predetermined number of FEC packets end without padding matching; and FEC packet header and padding matching occurs. The method further comprises tracking (707) the received FEC packets after receiver locking has occurred to ensure FEC parity packets are positioned properly in the FEC frames 50.

Moreover, the method may further comprise performing FEC decoding (706) upon completion of the locking process using a RS decoder. Preferably, the tracking process (707) comprises monitoring failure flags of the RS decoder. Additionally, the method may further comprise repeating the receiving (701) through matching (705) steps when a predetermined number of successive RS decoder failure flags are detected (708). Also, the method may further comprise initiating (709) a false alarm when the predetermined number of successive RS decoder failure flags are detected thereby indicating that the receiver is locked at an incorrect position. Preferably, the method further comprises using a three state FSM 100 to perform the comparing (703) through matching (705) steps. Furthermore, the predetermined number of FEC packets end without padding matching equals 9 minus a number of successive packet headers matching to start searching for padding.

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. Preferably, the embodiments that are implemented in software include, but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
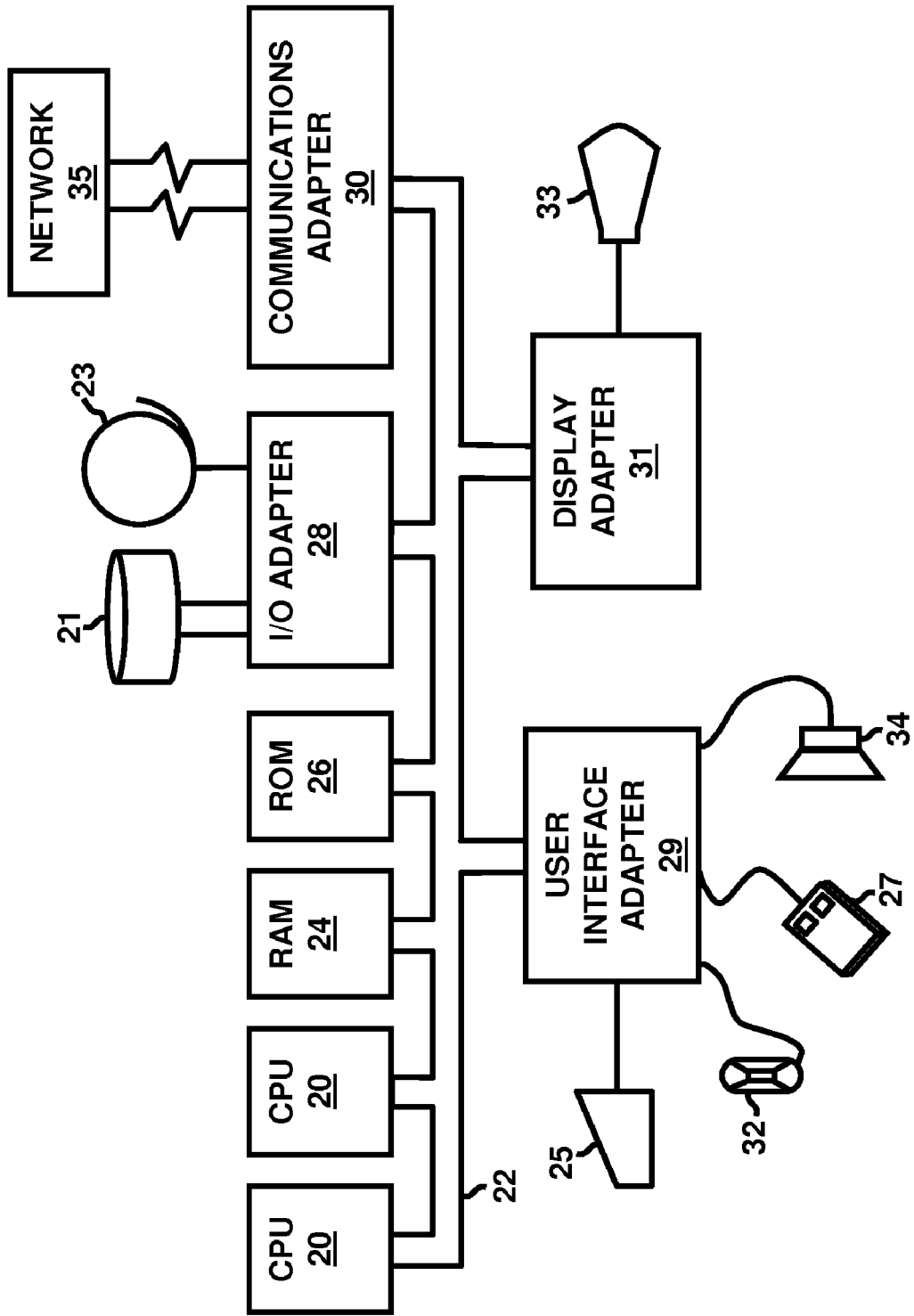
FIG. 8 is a schematic diagram illustrating a computer system according to an embodiment herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing Forward Error Correction (FEC) frame synchronization in a Digital Audio Broadcasting-Internet Protocol (DAB-IP) system comprising FEC frames, said method comprising:
   receiving a plurality of FEC packets, wherein each FEC packet comprises a FEC packet header and a FEC data field, and wherein said FEC data field comprises padding bytes in at least one of said plurality of FEC packets;
   comparing FEC packet headers of successively received FEC packets to known FEC packet headers until a number of FEC packet headers of successively received FEC packets are comparable to said known FEC packet headers, wherein a successively received FEC packet is comparable to known FEC packet header when a number of bit errors in a comparison of said successively received FEC packet and said known FEC packet header is less than a predetermined amount;
   comparing said received FEC packet header to said known FEC packet headers and said received padding bytes with known padding bytes, wherein said comparing comprises storing a number of successive FEC packet header mismatches and storing a number of FEC packets ends without padding matching, and wherein said comparing continues until at least one of the following actions occur:
      a predetermined number of successive FEC packet headers mismatches in said received FEC packet header has been found;
      a predetermined number of FEC packets end without padding matching has been found; and
      FEC packet header and padding matching occurs;
   tracking said successively received FEC packets after FEC packet header and padding matching has occurred to ensure FEC packets are positioned properly in said FEC frames.

2. The method of claim 1, further comprising performing FEC decoding upon completion of receiver locking using a Reed Solomon (RS) decoder.

3. The method of claim 2, wherein the tracking comprises monitoring failure flags of said RS decoder.

4. The method of claim 3, further comprising repeating the receiving through tracking when a predetermined number of successive RS decoder failure flags are detected.

5. The method of claim 4, further comprising initiating a false alarm when said predetermined number of successive RS decoder failure flags are detected thereby indicating that a receiver is locked at an incorrect position.

6. The method of claim 1, further comprising using a three state Finite State Machine (FSM) to perform the comparing through tracking.

7. The method of claim 1, wherein the predetermined number of FEC packets end without padding matching equals 9 minus a number of successive FEC packet headers matching to start searching for padding.

8. A program storage device readable by computer storing a program of instructions executable by said computer to perform a method of performing Forward Error Correction (FEC) frame synchronization in a Digital Audio Broadcasting-Internet Protocol (DAB-IP) system comprising FEC frames, said method comprising:
  receiving a plurality of FEC packets, wherein each FEC packet comprises a FEC packet header and a FEC data field, and wherein said FEC data field comprises padding bytes in at least one of said plurality of FEC packets;
  comparing FEC packet headers of successively received FEC packets to known FEC packet headers until a number of FEC packet headers of successively received FEC packets are comparable to said known FEC packet headers, wherein a successively received FEC packet is comparable to a known FEC packet header when a number of bit errors in a comparison of said successively received FEC packet and said known FEC packet header is less than a predetermined amount;
  comparing said received FEC packet header to said known FEC packet headers and said received padding bytes with known padding bytes, wherein said comparing comprises storing a number of successive FEC packet headers mismatches and storing a number of FEC packets end without padding matching, and wherein said comparing continues until at least one of the following actions occur:
    a predetermined number of successive FEC packet headers mismatches in said received FEC packet header has been found;
    a predetermined number of FEC packets end without padding matching has been found; and
    FEC packet header and padding matching occurs;
  tracking said successively received FEC packets after FEC packet header and padding matching has occurred to ensure FEC packets are positioned properly in said FEC frames.

9. The program storage device of claim 8, wherein said method further comprises performing FEC decoding upon completion of receiver locking using a Reed Solomon (RS) decoder.

10. The program storage device of claim 9, wherein in said method, the tracking comprises monitoring failure flags of said RS decoder.

11. The program storage device of claim 10, wherein said method further comprises repeating the receiving through tracking when a predetermined number of successive RS decoder failure flags are detected.

12. The program storage device of claim 11, wherein said method further comprises initiating a false alarm when said predetermined number of successive RS decoder failure flags are detected thereby indicating that a receiver is locked at an incorrect position.

13. The program storage device of claim 8, wherein said method further comprises using a three state Finite State Machine (FSM) to perform the comparing through tracking.

14. The program storage device of claim 8, wherein the predetermined number of FEC packets end without padding matching equals 9 minus a number of successive FEC packet headers matching to start searching for padding.

15. An electronic system for performing Forward Error Correction (FEC) frame synchronization in a Digital Audio Broadcasting-Internet Protocol (DAB-IP) system comprising FEC frames, said electronic system comprising:
  a receiver adapted to receive a plurality of FEC packets, wherein each FEC packet comprises a FEC packet header and a FEC data field, and wherein said FEC data field comprises padding bytes in at least one of said plurality of FEC packets; and
  a hardware-configured three state Finite State Machine (FSM) operatively connected to said receiver, wherein said three state FSM is adapted to perform:
    comparing FEC packet headers of successively received FEC packets to known FEC packet headers until a number of FEC packet headers of successively received FEC packets are comparable to said known FEC packet headers, wherein a successively received FEC packet is comparable to a known FEC packet when a number of bit errors in a comparison of said successively received FEC packet and said known FEC packet header is less than a predetermined amount;
    comparing said received FEC packet header to said known FEC packet headers and said padding bytes with known padding bytes, wherein said comparing comprises storing a number of successive FEC packet headers mismatches and storing a number of FEC packets end without padding matching, and wherein said comparing continues until at least one of the following actions occur:
      a predetermined number of successive FEC packet headers mismatches in said received FEC packet header has been found;
      a predetermined number of FEC packets end without padding matching has been found; and
      FEC packet header and padding matching occurs;
    tracking said successively received FEC packets after FEC packet header and padding matching has occurred to ensure FEC packets are positioned properly in said FEC frames.

16. The electronic system of claim 15, further comprising a Reed Solomon (RS) decoder adapted to perform FEC decoding upon completion of receiver locking.

17. The electronic system of claim 16, wherein said RS decoder comprises failure flags adapted to allow said three state FSM to track the received FEC packets.

18. The electronic system of claim 17, wherein when a predetermined number of successive RS decoder failure flags are detected, said three state FSM is adapted to repeat the receiving through tracking.

19. The electronic system of claim 18, further comprising a false alarm indicator adapted to issue a false alarm when said predetermined number of successive RS decoder failure flags are detected thereby indicating that a receiver is locked at an incorrect position.

20. The electronic system of claim 15, wherein the predetermined number of FEC packets end without padding matching equals 9 minus a number of successive FEC packet headers matching to start searching for padding.

* * * * *